AUTOMATIC GAIN CONTROL CIRCUIT

Filed Sept. 28, 1967

Inventor
ROBERT B. HANSEN.

BY Mueller, Aichele & Rauner

ATTYS.

United States Patent Office 3,532,812
Patented Oct. 6, 1970

3,532,812
AUTOMATIC GAIN CONTROL CIRCUIT

Robert B. Hansen, Arlington Heights, Ill., assignor to Motorola, Inc., Franklin Park, Ill., a corporation of Illinois Filed Sept. 28, 1967, Ser. No. 671,430
Int. Cl. H04n *5/56*; H04b *1/16*
U.S. Cl. 178—7.3 6 Claims

ABSTRACT OF THE DISCLOSURE

The circuit applies a gain control signal to the IF stage of a wave signal receiver and a delayed gain control signal to the RF stage thereof. To maintain the gain of the IF stage constant as the RF stage begins to reduce in gain, a circuit is coupled from the RF stage to the IF stage to tend to increase the gain of the latter to compensate for the tendency of the gain control signal to reduce its gain.

Background of the invention

If the amplitude of the composite video signal developed in a television receiver is allowed to vary significantly, a strong incoming signal may cause the video amplifiers to become overloaded resulting in cross-modulation and clipping of the synchronizing signal components, while a weak incoming signal may cause the output of the video amplifiers to be too low to provide proper picture reproduction. In addition, unwanted variations of contrast may result from a video signal which is changing in amplitude. To maintain the video signal relatively constant with variations in the level of the incoming television signal, an automatic gain control circuit is commonly employed to maintain the signal level to the video detector at a substantially constant level. The AGC function is accomplished by developing a control signal which is proportional to the strength of the incoming signal and is applied to the radio frequency (RF) and intermediate frequency (IF) stages in a manner which decreases the respective gains as the strength of the incoming signal increases.

It has been learned that when the gain of the RF stage is reduced, the signal-to-noise ratio of the receiver degrades to undesirably increase the noise composition of the video signal. Therefore, the gain of the RF stage should be maintained at a maximum while the gain of the IF stage is decreased for a range of the weakest signals to be received. When the incoming signal is strong enough to appreciably override the noise, the gain of the RF stage should be reduced in order to prevent overload of succeeding stages such as the converter. Since the converter has a non-linear transfer characteristic, excessively high level signals applied to it will introduce intermodulation products into the video signals.

Therefore, it is desirable to main the RF gain constant so that the level of the converter input signal continues to increase for weak incoming signals of increasing strength until the level of such input signal is slightly less than that which provides converter overload. For further increases in the incoming signal strength, the IF gain should be maintained constant and the RF gain should be reduced at a rate to provide a converter input signal having a constant amplitude slightly less than the converter overload level.

In receivers using vacuum tubes, when the incoming signal reached the converter overload level, the gain control signal would rapidly reduce in gain the RF stage due to the inherent cutoff characteristics of the RF tube. However, the gain control signal continued to be applied to the IF stages so that they continued to reduce in gain, and the detector level remained constant only because the RF stages would be reduced in gain at a slower rate. Thus the output of the RF stages would continue to rise and in order to prevent converter overload, the RF delay was decreased so that it would be reduced in gain before the incoming signal was strong enough to override the noise.

In present day transistorized receivers, the problem is even more acute. Transistors are known to have a plateau region, that is, a region in which a change in bias will cause almost no change in gain. Therefore, if the RF stage is quiescently biased in the middle of the plateau region where its gain is a maximum, even though the delay circuit permits a gain control signal to be applied to the RF stage, almost no RF gain change is noted. In order to prevent converter overload, the delay circuit was such as to apply the gain control signal to the RF stage at a lower incoming signal strength to deteriorate the signal-to-noise ratio of the receiver. If, on the other hand, the RF stage was quiescently biased on the edge of the plateau region, the RF stage would have less than maximum gain for weak incoming signals to again degrade the signal-to-noise ratio.

Summary of the Invention

It is therefore an object of this invention to provide an improved automatic gain control circuit for wave signal receivers so that the receiver is capable of handling a wide range of incoming signal levels.

Another object of this invention is to provide an automatic gain control circuit which provides maximum signal-to-noise ratio, yet minimizes the possibility of overloading of the receiver stages.

Another object is to provide an automatic gain control circuit for a transistorized wave signal receiver which maintains the gain of the RF stages substantially constant for weak signals and minimizes the change in gain of the IF stages for stronger incoming signals.

In practicing the invention, first and second amplifier circuits are coupled together by an intermediate signal translating circuit. A gain control signal indicative of the strength of the incoming signal applied to the receiver is generated in an automatic gain control circuit. A first circuit couples the control signal to the second amplifier circuit to reduce its gain when the incoming signal exceeds a first predetermined level by an amount related to the amount that the incoming signal exceeds such predetermined level. A second circuit couples a representation of the first gain control signal to the first amplifier circuit to reduce its gain when the incoming signal exceeds a second predetermined level by an amount related to the amount that the incoming signal exceeds such second predetermined level. The first amplifier circuit includes means to generate a second control signal indicative of the gain thereof. Another circuit couples the second gain control signal to the second amplifier circuit to tend to increase its gain and thereby lessen the overall change in its gain wen the incoming signal exceeds the second predetermined level.

Detailed description of the preferred embodiment

Figure 1:
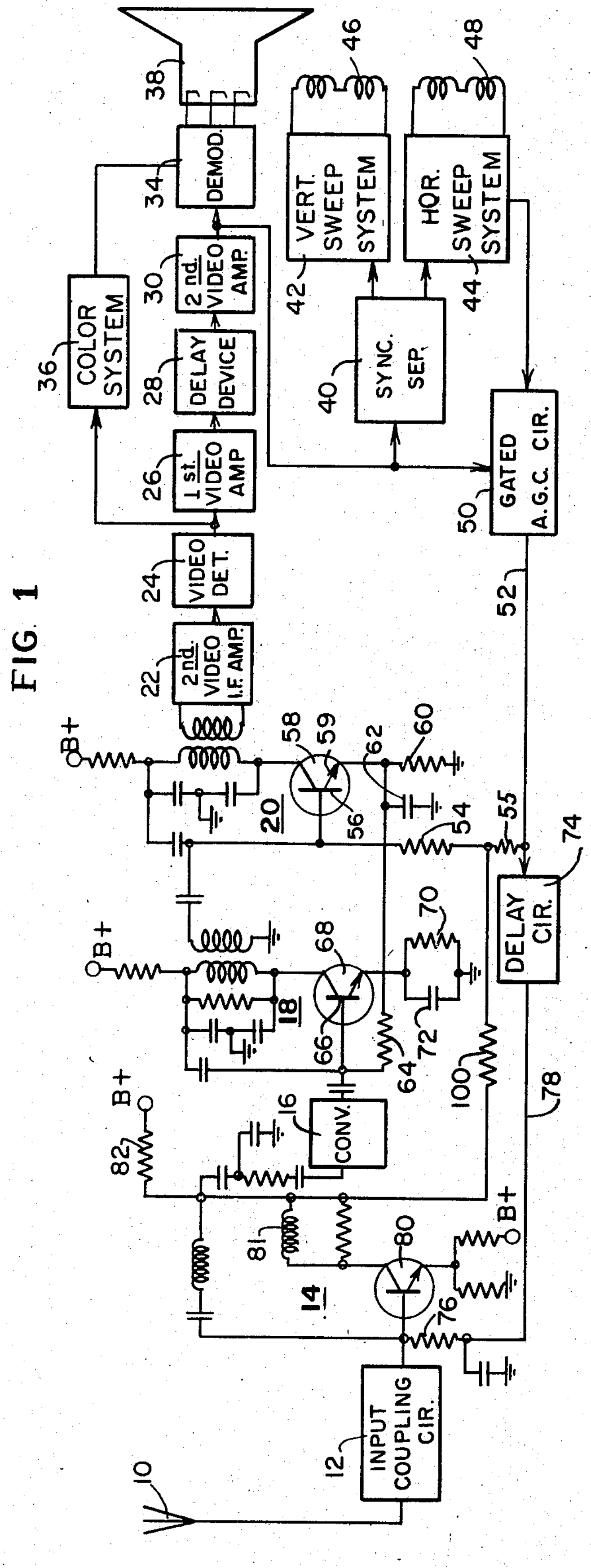
FIG. 1 illustrates a television receiver partially in block and partially in schematic illustrating the features of the invention.

Referring now to FIG. 1, there is shown a color television receiver wherein an incoming signal received by an antenna 10 is translated through an input coupling circuit 12 to a tuner which comprises at least one radio frequency (RF) stage 14 for amplifying the incoming RF signals. The RF signals are applied to a converter 16 which reduces the frequency thereof to provide intermediate frequency (IF) signals. The IF signals are amplified in a series of IF amplifiers 18, 20 and 22, and detected in a video detector 24 to provide a composite video signal. The brightness components and synchronizing components in the video signal are amplified in first video amplifier 26, delayed in delay device 28 for purposes well known to those skilled in the art, amplified in second video amplifier 30, and applied to the demodulator 34. A composite color signal is supplied to color system 36 which is demodulated in the demodulator 32 to produce red, blue and green video voltages for causing the multigun cathode ray tube 38 to produce a color image.

The synchronizing components in the composite video signal are separated in a synchronizing signal separator circuit 40 and are supplied to the vertical sweep system 42 and horizontal sweep system 44. The systems respectively develop vertical and horizontal sweep signals in the vertical deflection winding 46 and horizontal deflection winding 48 each of which is disposed on the neck of the cathode ray tube 38.

The composite video signal is also applied to a gated automatic gain control (AGC) circuit 50 which is gated into conduction only during horizontal retrace by pulses from horizontal sweep system 44. The gated AGC circuit 50, therefore, develops a gain control signal on conductor 52 which changes in amplitude according to the peak amplitude of the synchronizing pulses which is in turn dependent on the strength of the incoming signals appearing at antenna 10. Conductor 52 is coupled through resistors 54 and 55 to the base 56 of an NPN transistor 58 in the second IF amplifier 20. The emitter 59 of transistor 58 is coupled to ground by way of a resistor 60 and a bypass capacitor 62. The emitter 59 is coupled through a resistor 64 to the base 66 of the NPN transistor 68 in the first IF amplifier 18. The emitter of transistor 68 is coupled through a resistor 70 to ground and is bypassed by a capacitor 72.

In this particular embodiment, forward AGC is employed, that is, the appropriate transistors are reduced in gain by increasing their forward bias and therefore the control signal on conductor 52 becomes more positive as the strength of the incoming signal increases. Accordingly, the base 56 of transistor 58 is driven more positive to increase the current through transistor 58 which reduces the gain of IF amplifier 20 and increases the voltage drop across resistor 60 to provide a second gain control potential. The second gain control potential has become more positive due to the increase in strength of the incoming signal and therefore when applied to the base 66 of transistor 68, reduces the gain of the first IF amplifier 18.

The gain control signal on conductor 52 is applied to a delay circuit 74 which may comprise any one of the presently known delay circuits. Resistor 76 couples conductor 78 to the base of an NPN transistor 80 in the RF amplifier stage 14 to establish a quiescent bias therefor. The direct current in the collector-emitter of transistor 80 flows through a load impedance comprising inductor 81 and resistor 82. For the range of weakest incoming signals of increasing strength, the delay circuit 74 precludes the changing gain control signal on conductor 52 to be reflected on conductor 78. Accordingly, the RF gain remains fixed even though the incoming signal strength is increasing. Once the gain control signal on conductor 52 reaches a predetermined level corresponding to a predetermined incoming signal strength, the control signal on conductor 78 begins to increase the forward bias on transistor 80 and thereby reduce its gain.

Figure 2:
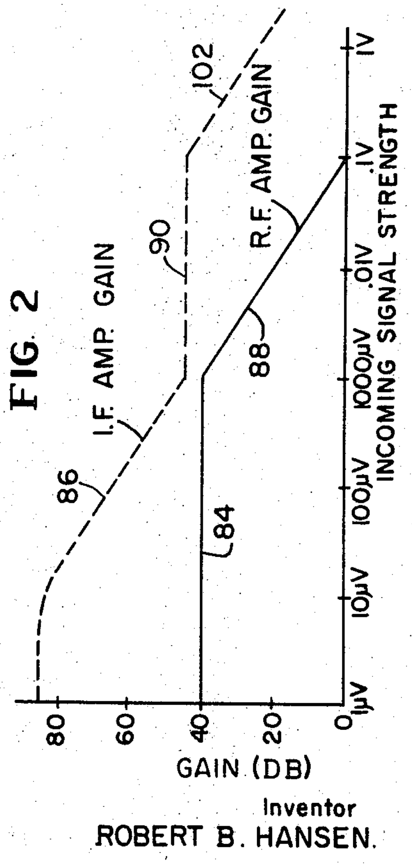
FIG. 2 illustrates the gain characteristics of the IF and RF amplifiers in the receiver of FIG. 1.

Reference is now made to the graph of FIG. 2 which plots the strength of the incoming signal against the absolute gain in decibels (db) of the RF stage 14 and of the IF stages 18 and 20. The values given in the graph are merely illustrative and it is not intended that they should limit the scope of the invention. Initially, for say the first 10 microvolts of incoming signal strength, the IF amplifier gain is not affected because of inherent delay in the gated AGC circuit 50. At about 10 microvolts, the gain control signal on conductor 52 begins to increase to decrease the gain of the IF stages 18 and 20 as indicated by the region 86. The values of the biasing resistors in the IF stages 18 and 20 are selected so that the slope of region 86 is approximately 20 db per octave, that is, if the gain is 70 db for an incoming signal of 50 microvolts, then the gain at 500 microvolts should be 50 db. If this is the case and if the RF amplifier gain in region 84 is constant, the signal applied to the video detector 24 will be constant. Due to the action of delay circuit 74, the gain of the RF amplifier stage 14 remains constant from no incoming signal to, for example, 1000 microvolts. By maintaining the gain of the RF stage 14 at its maximum value within the range of weak signals, that is, region 84, the signal-to-noise ratio of the receiver is maintained at its maximum value. This, however, also means that the output of the RF stage 14 is increasing at a 20 db per octave rate with increasing incoming signal strength.

Assume that the converter 16 will become overloaded if the signal applied thereto exceeds a predetermined level of, for example, .1 volt. This means that if the gain of the RF stage 14 is maintained constant, for an incoming signal exceeding 1000 microvolts, the converter 16 will become overloaded. It is therefore necessary that once such predetermined level is reached, the gain of the RF stage 14 be reduced. If the gain of the RF stage is reduced at a 20 db per octave rate as indicated by the region 88, the input to the converter 16 will be maintained constant at .1 volt even though the strength of the incoming signal in increasing from 1000 microvolts to .1 volt. If the input to the converter 16 is constant, then the gain of the IF amplifier stages 18 and 20 must be maintained constant in order to provide a constant amplitude signal to the video detector 24. This is indicated by the region 90. What has been explained thus far in FIG. 2 represents an idealized operation because the gain of the RF amplifier stage 14 is maintained at a maximum to maximize the signal-to-noise ratio of the receiver for weak incoming signals. This maximum signal-to-noise ratio is maintained up to the point where the converter would become overloaded and at that time the RF amplifier gain is reduced by an amount corresponding to the increase in the received signal strength to insure that the converter does not become overloaded.

Without additional circuitry this idealized operation cannot even be approached. The reason for this is that the gain control signal on conductor 52 continues to be applied to the IF amplifier stage 20 and indirectly to the IF amplifier stage 18 even beyond the converter overload incoming signal strength level of 1000 microvolts so that the IF stage gain continues to reduce and the region 90 will not be flat but rather will continue to slope downwardly although at a lesser rate due to characteristics of the transistors and their biasing arrangements. If that is the case, in order to maintain a constant level to the video detector 24, the gain of the RF stage 14 cannot be reduced at a 20 db octave rate but rather must decrease at a slower rate so that the region 88 will have less of a slope. Now, if the incoming signal strength exceeds 1000 microvolts, the input to the converter 16 will increase beyond the .1 volt maximum which can be applied to it without overloading it. In order to overcome this, some present AGC systems provide less delay in the delay circuit 74 so that the RF stage 14 begins to reduce at a lower incoming signal strength such as 500 microvolts or less. If, for example, 800 microvolts of incoming signal is necessary to override the noise in the signal, this solution has substantially deteriorated the signal-to-noise ratio of the receiver.

Figure 3:
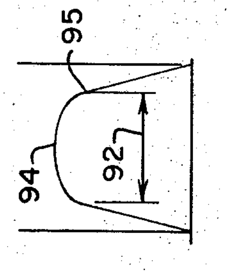
FIG. 3 illustrates the gain characteristics of a transistor.

An additional problem arises from the fact that the gain characteristic of a transistor shown in FIG. 3 has a plateau region 92. If the transistor 80 in the RF stage 14 were biased at its maximum gain point 94 at the center of the plateau region 92, to provide maximum signal-to-noise ratio for weak signals, an increase in the bias voltage within the plateau region will provide very little change in gain. Thus when the incoming signal exceeds 1000 microvolts and the delay circuit 74 permits the gain control signal on conductor 76 to change, the gain of RF stage 14 decreases only slightly until the edge 95 of the plateau region 92 is reached at which time the gain will reduce faster. In FIG. 2, this will be reflected as a decrease in the slope of region 88 during its initial portion. Again, in order to prevent converter overload, less delay must be provided which degrades the signal-noise-ratio of the receiver.

Another solution has been to quiescently bias the transistor 80 at the edge 95 of the plateau region 92 so that when the RF gain reduction cuts in, it will occur at the rapid change portion of the gain characteristic. However, this is not entirely satisfactory as the RF gain throughout the entire weak signal range, that is region 84, would be say 35 db instead of 40 db to again degrade the receiver signal-to-noise ratio.

The invention contemplated here, however, much more closely approaches the ideal operation. A resistor 100 is coupled from the top of load resistor 81 in RF stage 14 to the junction of resistor 54 and 55, and conductor 52. Up to an incoming signal strength of 1000 microvolts, the operation is as explained previously, that is, the delay circuit 74 prevents the RF stage 14 from reducing in gain while the IF stages 18 and 20 are together reduced at a 20 db per octave rate. When the gain control signal on conductor 78 begins to change to increase the collector-emitter current of transistor 80 and to reduce the gain of the RF stage 14 due to forward AGC action, the DC voltage at the top of resistor 81 begins to decrease which decrease is coupled through resistor 100 to the junction of resistor 54 and conductor 52. Resistors 100 and 54 are selected so that this DC voltage or control signal from RF stage 14 decreases (goes less positive) by an amount substantially equal to the increase in gain control potential on conductor 52. In such case, the overall control signal to IF stage 20 and indirectly to IF stage 18 remains unchanged as the incoming signal exceeds 1000 microvolts. Thus the RF stage 14 may be reduced in gain at its full 20 db per octave rate to maintain the input to the converter 16 slightly below the converter overload level of .1 volt. In addition, the gain of the RF stage 14 may remain constant up to an incoming signal of 1000 microvolts which would be sufficient to override noise in the signal. It may be appreciated that below 1000 microvolts, the gain control signal from RF stage 14 through resistor 100 does not change because the gain of the RF stage 14 is not changing. This in turn means that the IF stages 18 and 20 may be reduced in gain at a full 20 db per octave rate.

After the RF stage 14 has reduced in gain so that it provides no amplification, at for example .1 volt of incoming signal, the RF amplifier gain characteristic again flattens out so that the gain of the RF stage 14 no longer changes and the gain control signal through resistor 100 no longer changes. Therefore at .1 volt the gain control signal on conductor 52 again starts reducing the gain of IF amplifier 18 and 20 as indicated by the region 102 of FIG. 2.

What has been described therefore is an improved automatic gain control circuit for a wave signal receiver which permits the receiver to operate at maximum signal-to-noise ratio for weak signals over as wide a range of weak signals as possible without overloading succeeding stages in the receiver.

What is claimed is:

1. In a wave signal receiver, the combination of: first and second amplifier circuits, means coupling said first amplifier circuit to said second amplifier circuit for coupling signals thereto, first circuit means to derive a first control signals indicative of the strength of an incoming signal applied to the receiver, second circuit means coupling said first circuit means to said second amplifier circuit for coupling said control signal thereto to reduce the gain thereof in response to an incoming signal in a first region which exceeds a first predetermined level and by an amount related to the amount that the incoming signal exceeds such predetermined level, third circuit means coupling said first circuit means to said first amplifier circuit for coupling a signal representing said first control signal thereto to reduce the gain thereof in response to an incoming signal in a second region which exceeds a second higher predetermined level and by an amount related to the amount that the incoming signal exceeds said second predetermined level, said first amplifier circuit including means to generate a second control signal indicative of the gain thereof, and fourth circuit means coupling said last mentioned means to said second amplifier circuit for coupling said second control signal thereto to tend to increase the gain thereof by an amount substantially equal to the decrease in gain thereof provided by said first circuit means to cause said second amplifier circuit to have a substantially constant gain when said incoming signal is in said second region.

2. The wave signal receiver set forth in claim 1 wherein said second amplifier circuit includes first and second cascaded amplifier devices each having an input electrode, wherein said second circuit means is direct current coupled between said first circuit means and the input electrode of said second amplifier device, means to generate a third control signal which varies with said first control signal, and means direct current coupling said last mentioned means to the input electrode of said first amplifier device.

3. The wave signal receiver set forth in claim 1 wherein said first amplifier circuit includes a transistor having input and output electrodes and a load impedance circuit coupled to said output electrode, wherein said third circuit means is coupled between said first circuit means and the input electrode of said first transistor, and wherein said fourth circuit means is coupled between said load impedance circuit and said second amplifier circuit, the current in said transistor representing the gain thereof and flowing through said impedance circuit to generate said second control signal.

4. The wave signal receiver set forth in claim 3 wherein said second amplifier circuit includes second and third cascaded transistors each having an input electrode, wherein said second circuit means is direct current coupled between said first circuit means and the input electrode of said third transistor, means coupled to said third transistor to generate a third control signal which substantially follows said first control signal, means direct current coupling said last mentioned means to the input electrode of said second transistor, and wherein said fourth circuit means is coupled from said load impedance circuit in said first amplifier circuit to the input electrode of said third transistor.

5. In a television receiver having a first amplifier circuit for amplifying received television signals, a converter coupled to the first amplifier circuit for reducing the frequency of the television signals, a second amplifier circuit coupled to the converter for amplifying the reduced frequency television signals, a detector circuit coupled to the second amplifier circuit for deriving a composite video signal, an automatic gain control circuit including in combination; first circuit means coupled to the detector circuit for providing a first gain control signal indicative of the strength of the television signals, second circuit means coupling said first circuit means to said second amplifier circuit for coupling said control signal thereto to reduce the gain thereof in response to a television signal in a first region which exceeds a first predetermined level and by an amount related to the amount that the television signals exceed such predetermined level, third circuit means coupling said first circuit means to the first amplifier circuit for delaying application of said first gain control signal thereto and maintaining the gain of the first amplifier circuit constant until the television signal strength exceeds a second higher predetermined level defining a second region and decreasing the gain of the first amplifier circuit by an amount related to an amount that the television signals exceed said second predetermined level, the first amplifier circuit including means to generate a second gain control signal indicative of the gain thereof, and fourth circuit means coupling said last mentioned means to the second amplifier circuit for coupling said second gain control signal thereto to tend to increase the gain thereof by an amount substantially equal to the decrease in gain thereof provided by said first circuit means, causing said second amplifier circuit to have a substantially constant gain when the television signals are in said second region.

6. The television receiver set forth in claim 5 wherein said first amplifier circuit includes a transistor having base and collector electrodes and load resistance means coupled to said collector electrode to sense current through the transistor, said third circuit means comprises resistance means coupled between said first circuit means and said base electrode, and wherein said fourth circuit means comprises resistance means coupled between said local resistance means and the second amplifier circuit.

References Cited

UNITED STATES PATENTS

| | | | |
|---|---|---|---|
| 3,344,355 | 9/1967 | Massman | 325—410 |
| 3,457,366 | 7/1969 | Kent et al. | 325—404 |
| 2,961,534 | 11/1960 | Scott | 325—410 |
| 3,328,714 | 6/1967 | Hugenholtz | 325—410 |
| 3,333,199 | 7/1967 | Janssen | 325—410 |

RICHARD MURRAY, Primary Examiner

J. C. MARTIN, Assistant Examiner

U.S. Cl. X.R.

325—404, 405, 410